United States Patent [19]

Hirata et al.

[11] Patent Number: 5,576,412
[45] Date of Patent: Nov. 19, 1996

[54] OPTICAL URETHANE RESIN

[75] Inventors: Fumiaki Hirata, Sakai; Tatsuya Nakashima, Nishinomiya; Ichiro Minato, Kobe, all of Japan

[73] Assignee: Takeda Chemical Industries, Ltd., Osaka, Japan

[21] Appl. No.: 242,240

[22] Filed: May 13, 1994

[30] Foreign Application Priority Data

May 20, 1993 [JP] Japan ................................ 5-118103

[51] Int. Cl.⁶ ...................................... C08G 18/32
[52] U.S. Cl. .................. 528/85; 528/44; 528/49; 528/65; 528/66; 351/159; 351/160 R
[58] Field of Search ................... 528/44, 49, 65, 528/66, 85; 351/159, 160 R

[56] References Cited

U.S. PATENT DOCUMENTS

| | | | |
|---|---|---|---|
| 4,689,387 | 8/1987 | Kajimioto et al. ...................... | 528/76 |
| 4,904,704 | 2/1990 | Nafziger et al. ........................ | 521/156 |
| 4,996,351 | 2/1991 | Nafziger et al. ........................ | 560/352 |
| 5,194,559 | 3/1993 | Okazaki et al. .......................... | 528/65 |

FOREIGN PATENT DOCUMENTS

| | | |
|---|---|---|
| 0506315 | 9/1992 | European Pat. Off. . |
| 0561568 | 9/1993 | European Pat. Off. . |

*Primary Examiner*—James J. Seidleck
*Assistant Examiner*—Duc Truong
*Attorney, Agent, or Firm*—Wenderoth, Lind & Ponack

[57] ABSTRACT

An optical urethane resin is obtained by reacting a polyiso(thio)cyanate compound having a hydrolyzable chlorine content of not greater than 300 ppm with an active hydrogen compound. There is provided an optical urethane resin with a minimum of coloration, a high total light transmittance and free of optical distortion.

7 Claims, No Drawings

OPTICAL URETHANE RESIN

FIELD OF THE INVENTION

This invention relates to an optical urethane resin obtained by reacting a polyiso(thio)cyanate compound with an active hydrogen compound. More particularly, the invention relates to an optical urethane resin of minimal coloration and high total light transmission and free of optical distortion.

BACKGROUND OF THE INVENTION

In the field of optical urethane resins and plastic lenses utilizing them, the resin obtained by reacting a halogen-containing compound having more than 2 hydroxyl groups with an isocyanate compound (JP Kokai S-58-164615/1983), the resin obtained by reacting a mercapto group-containing compound with an isocyanate compound (JP Kokai S-60-199016/1985) and a polyurethane resin added with a phenolic stabilizer (JP Kokai H-5-78441/1993), among others, have been proposed in many patent applications, all alluding to optical lenses of reduced coloration, high total light transmission and low optical distortion.

With regard to optical distortion, however, no drastic removal remains to be attained and because of the high rejection rate of products, the manufacturing conditions have to be corrected from time to time.

OBJECTS OF THE INVENTION

One object of the invention is to provide a novel optical urethane resin.

Another object of the invention is to provide a optical product prepared by using the optical urethane resin.

SUMMARY OF THE INVENTION

The inventors of this invention made an intensive exploration for iso(thio)cyanate compounds contributory to the production of optical urethane resins which would be colorless, transparent and free of optical distorsion and discovered that polyiso(thio)cyanates of low hydrolyzable chlorine content are optimal for the above purpose. This invention has been developed on the basis of the above finding.

This invention as such provides an optical lens which is little colored, high in total light transmittance and free of optical distorsion by way of utilizing an optical urethane resin obtainable by reacting a polyiso(thio)cyanate compound having a hydrolyzable chlorine content of not greater than 300 ppm with an active hydrogen compound.

DETAILED DESCRIPTION OF THE INVENTION

The polyiso(thio)cyanate compound which is used in accordance with this invention is selected from the group consisting of a polyisocyanate compound, a polyisothiocyanate compound and an isothiocyanato group-containing isocyanate compound. The polyisocyanate compound mentioned above includes aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,3,5-triisocyanatomethylcyclohexane, 1,8-diisocyanato-4-isocyanatomethyloctane, 2,5,7-trimethyl-1,8-diisocyanato-5-isocyanatomethyloctane, bis(isocyanatoethyl)carbonate, bis(isocyanatoethyl) ether, 1,4-butylene glycol dipropyl ether-$\alpha,\alpha$-diisocyanate, lysine diisocyanate methyl ester, lysine triisocyanate, 2-isocyanatoethyl-2,6-diisocyanatohexanoate, 2-isocyanatopropyl-2,6-diisocyanatohexanoate, araliphatic polyisocyanates such as xylylene diisocyanate, bis(isocyanatoethyl)benzene, bis(isocyanatopropyl)benzene, $\alpha,\alpha,\alpha',\alpha'$-tetramethylxylylene diisocyanate, bis(isocyanatobutyl)benzene, bis(isocyanatomethyl)naphthalene, bis(isocyanatomethyl)diphenyl ether, bis(isocyanatoethyl)phthalate, mesitylene triisocyanate, alicyclic polyisocyanates such as 2,6-di(isocyanatomethyl)furan, isophorone diisocyanate, bis(isocyanatomethyl) cyclohexane, dicyclohexylmethane diisocyanate, cyclohexane diisocyanate, methylcyclohexane diisocyanate, dicyclohexyldimethylmethane diisocyanate, 2,2''-dimethyldicyclohexylmethane diisocyanate, bis(4-isocyanato-n-butylidene)pentaerythritol, dimer acid diisocyanate, 2-isocyanatomethyl-3-(3-isocyanatopropyl)-5-isocyanatomethyl-bicyclo[2,2,1]-heptane, 2-isocyanatomethyl-3-(3-isocyanatopropyl)-6-isocyanatomethyl-bicyclo[2,2,1]-heptane, 2-isocyanatomethyl-2-(3-isocyanatopropyl)-5-isocyanatomethyl-bicyclo[2,2,1]-heptane, 2-isocyanatomethyl-2-(3-isocyanatopropyl)-6-isocyanatomethylbicyclo[2,2,1]-heptane, 2-isocyanatomethyl-3-(3-isocyanatopropyl)-5-(2-isocyanatoethyl)-bicyclo-[2,2,1]-heptane, 2-isocyanatomethyl-3-(3-isocyanatopropyl)-6-(2-isocyanatoethyl)-bicyclo-[2,2,1]-heptane, 2-isocyanatomethyl-2-(3-isocyanatopropyl)-5-(2-isocyanatoethyl)-bicyclo-[2,2,1]-heptane, 2-isocyanatomethyl-2-(3-isocyanatopropyl)-6-(2-isocyanatoethyl)-bicyclo-[2,2,1]-heptane, 2,5(or 6)bis(isocyanatomethyl)-bicyclo[2,2,1]-heptane, and aromatic polyisocyanates such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, 1,3,5-triisocyanatomethylbenzene, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI (diphenylmethane diisocyanate), naphthalene triisocyanate, diphenylmethane-2,4,4'-triisocyanate, 3-methyl-diphenylmethane-4,6,4'-triisocyanate, 4-methyl-diphenylmethane-3,5,2',4',6'-pentaisocyanate, phenylisocyanatomethyl isocyanate, phenylisocyanatoethyl isocyanate, tetrahydronaphthalene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate, dichlorocarbazole diisocyanate, etc.

The polyisocyanate compound which can be used in this invention may contain one or more sulfur atoms within the molecule. Among such polyisocyanate compounds are sulfur-containing aliphatic isocyanates such as thiodiethylene diisocyanate, thiodipropyl diisocyanate, thiodihexyl diisocyanate, dimethylsulfone diisocyanate, dithiodimethyl diisocyanate, dithiodiethyl diisocyanate, dithiodipropyl diisocyanate, etc., sulfide bond-containing aromatic isocyanates such as diphenylsulfido-2,4'-diisocyanate, diphenylsulfido-4,4'-diisocyanate, 3,3'-dimethoxy-4,4'-diisocyanatodibenzylthioether, bis(4-isocyanatomethylphenyl)sulfide, 4,4'-methoxyphenylthioethylene glycol-3,3'-diisocyanate, etc., disulfide bond-containing aromatic isocyanates such as diphenyldisulfido-4,4'-diisocyanate, 2,2'-dimethyldiphenyldisulfido-5,5'-diisocyanate, 3,3'-dimethyldiphenyldisulfido-5,5'-diisocyanate, 3,3'-dimethyldiphenyldisulfido-6,6'-diisocyanate, 4,4'-dimethyldiphenyldisulfido-5,5'-diisocyanate, 3,3'-dimethoxydiphenyldisulfido-4,4'-diisocyanate, 4,4'-dimethoxydiphenyldisulfido-3,3'-diisocyanate, etc., sulfone bond-containing aromatic isocyanates such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylsulfone-2,4'-diisocyanate, 4,4'-dimethoxydiphenylsulfone-3,3'-diisocyanate, 3,3'-dimethoxy-4,4'-diisocyanatobenzylsulfone, 4,4'-dimethyldiphenylsulfone-3,3'-diisocyanate, 4,4'-di-tert-butyldiphenylsulfone-3,3'-diisocyanate, 4,4'-methoxyphenylethylenesulfone-3,3'-diisocyanate, 4,4'-dicyclodiphenylsulfone-3,3'-diisocyanate, etc., sulfonic ester bond-containing aromatic isocyanates such as 4-methyl-3-isocyanatophenylsulfonyl-4'-isocyanatophenol ester, 4-methoxy-3-isocyanatophenylsulfonyl-4'-isocyanatophenol ester, etc., sulfonamide bond-containing aromatic isocyanates such as 4-methyl-3-isocyanatophenylsulfonylanilido-3'-methyl-4'-isocyanate, diphenylsulfonylethylenediamine-4,4'-diisocyanate, 4,4'-methoxyphenylsulfonylethylenediamine-3,3,-diisocyanate, 4-methyl-3-isocyanatophenylsulfonylanilido-4-methyl-3'-isocyanate, etc., sulfur-containing heterocyclic compounds such as thiophene-2,5-diisocyanate etc. and 1,4-dithian-2,5-diisocyanate, among others.

Furthermore, halogen (e.g. chloro, bromo, etc.)-, alkyl-, alkoxy- or nitro-substitution products, various derivatives as modified in the form of prepolymers with polyhydric alcohols, carbodiimide-, urea- or biuret-modification products, dimers and trimers of the above-mentioned isocyanates can also be employed. These compounds can be used alone or in combination.

The polyisothiocyanate compound includes aliphatic isothiocyanates such as 1,2-diisothiocyanatoethane, 1,3-diisothiocyanatopropane, 1,4-diisothiocyanatobutane, 1,6-diisothiocyanatohexane, p-phenyleneisopropylidene diisothiocyanate, etc., alicyclic isothiocyanates such as cyclohexane diisothiocyanate etc., aromatic isothiocyanates such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzne), 1,1'-methylenebis(4-isothiocyanato-2-methylbenzene), 1,1'-methylenebis(4-isothiocyanato-3-methylbenzene), 1,1'-(1,2-ethanediyl)bis(4-isothiocyanatobenzene), 4,4'-diisothiocyanatobenzophenone, 4,4'-diisothiocyanato-3,3'-dimethylbenzophenone, benzanilido-3,4'-diisothiocyanate, diphenylether-4,4'-diisothiocyanate, diphenylamine-4,4'-diisothiocyanate, etc., heterocycle-containing isothiocyanates such as 2,4,5-triisothiocyanato-1,3,5-triazine etc., and carbonyl isothiocyanates such as hexanedioyl diisothiocyanate, nonanedioyl diisothiocyanate, carbonic diisothiocyanate, 1,3-benzenedicarbonyl diisothiocyanate, 1,4-benzenedicarbonyl diisothiocyanate, (2,2'-bipyridine)-4,4'-dicarbonyl diisothiocyanate, etc.

The above-mentioned polyisothiocyanate compounds may contain one or more sulfur atoms in addition to those of isothiocyanate groups. Among such polyisothiocyanates are sulfur-containing aliphatic isothiocyanates such as thiobis(3-isothiocyanatopropane), thiobis(2-isothiocyanatoethane), dithiobis(2-isothiocyanatoethane), etc., sulfur-containing isothiocyanates such as 1-isothiocyanato-4-{(2-isothiocyanato)sulfonyl}benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-{(4-isothiocyanatophenyl)sulfonyl}-2-methoxybenzene, 4-methyl-3-isothiocyanatobenzenesulfonyl-4'-isothiocyanatophenyl ester, 4-methyl-3-isothiocyanatobenzenesulfonylanilido-3'-methyl-4'-isothiocyanate, etc. and sulfur-containing heterocyclic compounds such as thiophenone-2,5-diisothiocyanate, 1,4-dithian-2,5-diisothiocyanate, etc.

Furthermore, halogen (e.g. chloro, bromo, etc.)-, alkyl-, alkoxy- or nitro-substitution products, various derivatives as modified in the form of prepolymers with polyhydric alcohols, carbodiimide-, urea- or biuret-modification products, dimers and trimers of the above-mentioned isocyanates can also be employed.

The isothiocyanato-containing isocyanate compound which can be used in this invention includes aliphatic compounds such as 1-isocyanato-3-isothiocyanatopropane, 1-isocyanato-5-isothiocyanatopentane, 1-isocyanato-6-isothiocyanatohexane, isothiocyanatocarbonyl isocyanate, etc., alicyclic compounds such as 1-isocyanato-4-isothiocyanatocyclohexane, etc., aromatic compounds such as 1-isocyanato-4-isothiocyanatobenzene, 4-methyl-3-isocyanato-1-isothiocyanatobenzene, etc., heterocyclic compounds such as 2-isocyanato-4,6-diisothiocyanato-1,3,5-triazine etc. and compounds having sulfur atoms in addition to those of isothiocyanate groups, such as 4-isocyanato-4'-isothiocyanatodiphenyl sulfide, 2-isocyanato-2'-isothiocyanatodiethyl disulfide, etc., among others.

Furthermore, halogen (e.g. chloro, bromo, etc.)-, alkyl-, alkoxy- or nitro-substitution products, various derivatives as modified in the form of prepolymers with polyhydric alcohols, carbodiimide-, urea- or biuret-modification products, dimers and trimers of the above-mentioned isocyanates can also be employed. These compounds can be used alone or in combination.

The polyiso(thio)cyanate compound which can be used in this invention should have a hydrolyzable chlorine content of not greater than 300 ppm, preferably not greater than 200 ppm and, for still better results, not greater than 100 ppm. This is because when it exceeds 300 ppm, optical distorsion tends to take place.

The hydrolyzable chlorine content is determined by the method directed in JIS K-1556.

The active hydrogen compound for use in this invention is selected from the group consisting of a polyol compound, a polythiol compound and a hydroxythiol compound. The polyol compound includes aliphatic polyols such as ethylene glycol, diethylene glycol, propylene glycol, dipropylene glycol, butylene glycol, neopentyl glycol, glycerin, trimethylolethane, trimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, dulcitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5.2.3.0$^{2,6}$]decanedimethanol, bicyclo[4.3.0]nonanediol, dicyclohexanediol, tricyclo[5.3.1.1]

dodecanediol, bicyclo[4.3.0]nonanedimethanol, tricyclo[5.3.1.1]dodecanediethanol, hydroxypropyltricyclo[5.3.1.1]dodecanol, spiro[3.4]octanediol, butylcyclohexanediol, 1,1'-bicyclohexylidenediol, cyclohexanetriol, maltitol, lactose, etc., aromatic polyols such as dihydroxynaphthalene, trihydroxynaphthalene, tetrahydroxynaphthalene, dihydroxybenzene, benzenetriol, biphenyltetraol, pyrogallol, hydroxynaphthylpyrogallol, trihydroxyphenanthrene, bisphenol A, bisphenol F, xylylene glycol, di(2-hydroxyethoxy)benzene, bisphenol A bis(2-hydroxyethyl ether), tetrabromobisphenol A, tetrabromobisphenol A bis(2-hydroxyethyl ether), etc., halogenated polyols such as dibromoneopentyl glycol, etc., high molecular polyols such as epoxy resin; condensation products of said polyols with organic acids such as oxalic acid, glutamic acid, adipic acid, acetic acid, propionic acid, cyclohexanecarboxylic acid, β-oxocyclohexanepropionic acid, dimer acid, phthalic acid, isophthalic acid, salicylic acid, 3-bromopropionic acid, 2-bromoglycolic acid, dicarboxycyclohexane, pyromellitic acid, butanetetracarboxylic acid, bromophthalic acid, etc. addition products between an alkylene oxide, such as ethylene oxide or propylene oxide, and said polyols, addition products between alkylenepolyamine and alkylene oxide, e.g. ethylene oxide or propylene oxide, and sulfur-containing polyols such as bis[4-(hydroxyethoxy)phenyl]sulfide, bis[4-(2-hydroxypropoxy)phenyl]sulfide, bis[4-(2,3-dihydroxypropoxy)phenyl]sulfide, bis[4-(4-hydroxycyclohexyloxy)phenyl]sulfide, bis[2-methyl-4-(hydroxyethoxy)-6-butylphenyl]sulfide, etc., compounds available on addition to these compounds of an average of not more than 3 mols per hydroxy group of ethylene oxide and/or propylene oxide, di(2-hydroxyethyl)sulfide, 1,2-bis(2-hydroxyethylmercapto)ethane, bis(2-hydroxyethyl)disulfide, 1,4-dithian-2,5-diol, bis(2,3-dihydroxypropyl)sulfide, tetrakis(4-hydroxy-2-thiabutyl)methane, bis(4-hydroxyphenyl)sulfone (tradename Bisphenol S), tetrabromobisphenol S, tetramethylbisphenol S, 4,4'-thiobis(6-tert-butyl-3methylphenol), 1,3-bis(2-hydroxyethylthioethyl)cyclohexane and so on.

The polythiol compound includes aliphatic polythiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2.2.1]heptane-exo-cis-2,3-dithiol, 1,1-bis(mercaptomethyl)cyclohexane, thiomalic acid bis(2-mercaptoethyl) ester, 2,3-dimercaptosuccinic acid 2-mercaptoethyl ester, 2,3-dimercapto-1-propanol 2-mercaptoacetate, 2,3-dimercapto-1-propanol 3-mercaptoacetate, diethylene glycol bis(2-mercaptoacetate), diethylene glycol bis(3-mercaptopropionate), 1,2-dimercaptopropyl ethyl ether, 2,3-dimercaptopropyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane, etc., aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptoethyl)benzene, 1,2,3,5-tetrakis(mercaptoethyl)benzene, 1,2,4,5-tetrakis(mercaptomethyleneoxy)benzene, 1,2,3,4-tetrakis(mercaptomethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, etc., halogen-substituted aromatic polythiols such as chloro- or bromo-substituted 2,5-dichlorobenzene-1,3-dithiol, 1,3-di(p-chlorophenyl)propane-2,2-dithiol, 3,4,5-tribromo-1,2-dimercaptobenzene, 2,3,4,6-tetrachloro-1,5-bis(mercaptomethyl)benzene, etc., and heterocycle-containing polythiols such as 2-methylamino-4,6-dithiol-symtriazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-symtriazine, etc., aromatic polythiols having sulfur atoms in addition to those of mercapto groups such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, etc. and nuclear alkylation products of such compounds, aliphatic polythiols containing sulfur atoms in addition to those of mercapto groups, such as bis(mercaptomethyl) sulfide, bis(mercaptoethyl) sulfide, bis(mercaptopropyl)sulfide, bis(mercaptomethylthio)methane, bis(2-mercaptoethylthio)methane, bis(3-mercaptopropyl)methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3mercaptopropylthio)propane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithian, bis(mercaptomethyl) disulfide, bis(mercaptoethyl) disulfide, bis(mercaptopropyl) disulfide, etc., thioglycolic acid or mercaptopropionic acid esters of said compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithian-2,5-diol bis(2mercaptoacetate), 1,4-dithian-2,5-diol bis(3-mercaptopropionate), thioglycolic acid bis(2-mercaptoethyl ester), thiodipropionic acid bis(2-mercaptoethyl ester), 4,4'-thiodibutyric acid bis(2-mercaptoethyl ester), dithiodiglycolic acid bis(2-mercaptoethyl ester), dithiodipropionic acid bis(2-mercaptoethyl ester), 4,4'-dithiodibutyric acid bis(2-mercaptoethyl ester), thiodiglycolic acid bis(2,3-dimercaptopropyl ester), thiodipropionic acid bis(2,3-dimercaptopropyl ester), dithioglycolic acid bis(2,3-dimercaptopropyl ester), dithiodipropionic acid 2,3-dimercaptopropyl ester etc., and heterocyclic compounds having sulfur atoms in addition to those of mercapto groups, such as 3,4-thiophenedithiol, 2,5-dimercapto-1,3,4-thiadiazole, etc., among others.

The hydroxythiol compound includes 2-mercaptoethanol, 3-mercapto-1,2-propanediol, glycerol di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycol), pentaerythritol pentakis(3-mercaptopropionate), hydroxymethyl-tris-(mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethyl sulfide mono(3-mercaptopropionate), dimercaptoethane mono(salicylate), hydroxyethylthiomethyl-tris(mercaptoethylthio)methane and so on.

Furthermore, halogen (e.g. chloro, bromo, etc.)-substitution products of said active hydrogen compounds can also be employed. These compounds may be used alone or in combination.

The ratio of the polyiso(thio)cyanate compound to the active hydrogen compound, viz. iso(thio)cyanato/active hydrogen ratio, is generally within the range of 0.5–3.0 and preferably 0.5–1.5.

According to the intended use, the known chain extender, crosslinking agent, photostabilizer, ultraviolet absorber, antioxidant, oil bath dye, filler, internal lubricant, etc. can be added. To control the reaction rate, the known reaction catalyst which is used in the production of polyurethanes can also be added where appropriate.

The urethane resin thus obtained has excellent optical properties such as high refractive index and low dispersion and can be used with advantage as the raw material for various optical products such as the plastic lens, prism, optical fiber, information recording medium substrate, color filter, infrared absorption filter and so on.

A process for the production of a plastic lens is now described by way of illustration. Preferably one or more species of the polyiso(thio)cyanate compound, one or more species of the active hydrogen compound and optionally said additives and catalyst are blended and cast in a mold for in situ reaction. Before casting, the composition is degassed to prevent inclusion of air cells in the resin.

The reaction temperature and time are dependent on the species of starting compounds and types of additives used but the temperature is generally −50° C.–200° C., preferably room temperature −150° C. and, for still better results, 50° C.–120° C. and the reaction time is generally 0.5–72 hours. The resultant lens may be annealed where necessary.

The optical urethane resin obtained by reacting a polyiso(thio)cyanate compound having a hydrolyzable chlorine content of not greater than 300 ppm with an active hydrogen compound is colorless, optically transparent and free of optical distorsion and is, therefore, useful for the manufacture of plastic lenses, prisms and other optical products.

EXAMPLES

The following examples and comparative examples are intended to illustrate this invention in further detail and should by no means be construed as defining the scope of the invention.

The following abbreviations are used in the examples.

| Abbreviation | |
|---|---|
| bis(Isocyanatomethyl)cyclohexane | $H_6XDI$ |
| Isophorone diisocyanate | IPDI |
| Xylylene diisocyanate | XDI |
| 1,3,5-Triisocyanatomethylcyclohexane | $H_6MTI$ |
| 1,3,5-Triisocyanatomethylbenzene | MTI |
| Tolylene diisocyanate | TDI |
| Pentaerythritol tetrakis(3-mercaptopropionate) | DETMP |
| bis(2-Mercaptoethyl) ether | BMEE |
| Diethylene glycol | DEG |

Example 1

$H_6XDI$ with a hydrolyzable chlorine content (as determined by the method of JIS K-1556; the same applies hereinafter) of 60 ppm was mixed with DETMP in an NCO/SH mol ratio of 1.0 and the composition was degassed under reduced pressure. The defoamed composition was cast in a mold comprising a glass mold body and gasket assembly measuring 8 mm in thickness and 70 mm in diameter. The mold temperature was gradually increased from 20° C. to 120° C. and the load was caused to harden for 24 hours. The resultant 8 mm-thick flat plate was released from the mold and visually inspected for optical distortion (aberration pattern). The yellowness index was determined in accordance with JIS K-7105-6.3. The results are shown in Table 1.

JIS K-1556

Procedure

Weigh (by difference to the nearest 0.1 g) 1 to 10 g of sample from a sampling weighing bottle into a clean, dry 400-mL beaker. Add 100 mL of methanol and stir. Stir continually while the reaction starts at which point the beaker will become warm and crystals may form on the sides of the beaker. Fill the beaker half-full with water and boil gently for 1 hr.

Wash the sides of the beaker with water and remove and wash the stirring bar. Cool the beaker in an ice bath to about 10° C. and add 10 drops of $HNO_3$. Titrate potentiometrically with 0.01N $AgNO_3$ solution using a silver-silver chloride electrode pair.

Calculation

Calculate the hydrolyzable chlorine as weight percent as follows:

Hydrolyzable chlorine, % =3.55 AN/W where:
A=$AgNO_3$ solution required for titration of the sample, mL,
N=normality of the $AgNO_3$ solution, meq/mL,
W=sample used, g, and
3.55=constant combining the atomic weight of chlorine, (35.5), mg, the conversion from mg to 1000 g, and conversion to 100 %.

Hydrolyzable chlorine, %=35.5 AN (100)/1000 W=3.55 AN/W

Examples 2–6

Using the various polyiso(thio)cyanate compounds with hydrolyzable chlorine contents of not greater than 300 ppm and active hydrogen compounds indicated in Table 1, the polymerization reaction of Example 1 was repeated and the respective moldings were visually evaluated in the same manner. The yellowness index was determined in accordance with JIS K-7105-6.3. The results are shown in Table 1.

Comparative Examples 1–3

Using the various polyiso(thio)cyanates and polyiso(thio)cyanates added with a phenolic stabilizer, with hydrolyzable chlorine contents over 300 ppm and active hydrogen compounds indicated in Table 2, the polymerization reaction and visual evaluation of optical distorsion (aberration pattern) were carried out as in Example 1. The yellowness index was determined in accordance with JIS K-7105-6.3. The results are shown in Table 2.

TABLE 1

| Example | Polyiso(thio)cyanate compound (hydrolyzable Cl content, ppm) | Active hydrogen compound | Optical distorsion (aberration pattern) | Yellowness index (YI) |
| --- | --- | --- | --- | --- |
| 1 | $H_6$XDI (60) | DETMP | None | 1.1 |
| 2 | IPDI (90) | DETMP | None | 1.1 |
| 3 | XDI (120) | DETMP | None | 1.2 |
| 4 | $H_6$MTI (180) | BMEE | None | 1.3 |
| 5 | MTI (250) | DEG | None | 1.4 |
| 6 | TDI (260) | DETMP | None | 1.5 |

TABLE 2

| Comparative Example | Polyiso(thio)cyanate compound (hydrolyzable Cl content, ppm) | Active hydrogen compound | Optical distorsion (aberration pattern) | Yellowness index (YI) |
| --- | --- | --- | --- | --- |
| 1 | XDI (430) | DETMP | Distorted | 1.6 |
| 2 | IPDI (350) | DETMP | Distorted | 1.5 |
| 3 | XDI[1] (430) | DETMP | Distorted | 1.6 |

1) Adding 200 ppm of 2.6-di-t-butyl-4-hydroxytoluene.

As shown in Table 2, comparative Examples 1–3 have a optical distorsion even if a phenolic stabilizer is adding it.

What is claimed is:

1. An optical urethane resin obtained by reacting a polyisocyanate selected from the group consisting of an alicyclic polyisocyanate and an araliphatic polyisocyanate, said polyisocyanate having a hydrolyzable chlorine content of not greater than 100 ppm, with an active hydrogen compound selected from the group consisting of a polyol compound, a polythiol compound and a hydroxythiol compound.

2. The optical urethane resin according to claim 1, the isocyanate/active hydrogen mol ratio of which is 0.5 through 3.0.

3. The optical urethane resin according to claim 1 wherein said polyisocyanate is an alicyclic polyisocyanate.

4. The optical urethane resin according to claim 1 wherein said polyisocyanate is araliphatic polyisocyantes.

5. An optical product comprising the optical urethane resin claimed in claim 1.

6. The optical product according to claim 5 which is an optical lens.

7. A process for producing an optical urethane which comprises reacting a polyisocyanate selected from the group consisting of an alicyclic polyisocyanate and an araliphatic polyisocyanate, said polyisocyanate having a hydrolyzable chlorine content of not greater than 100 ppm, with an active hydrogen compound selected from the group consisting of a polyol compound, a polythiol compound and a hydroxythiol compound.

* * * * *